US009868607B2

(12) United States Patent
Brizzi

(10) Patent No.: US 9,868,607 B2
(45) Date of Patent: Jan. 16, 2018

(54) DEVICE FOR EJECTING A FLAT OBJECT DURING CONVEYING

(71) Applicant: BOBST MEX SA, Mex (CH)

(72) Inventor: Nicolas Brizzi, Martigny (CH)

(73) Assignee: BOBST MEX SA (CH)

( * ) Notice: Subject to any disclaimer, the term of this patent is extended or adjusted under 35 U.S.C. 154(b) by 0 days.

(21) Appl. No.: 14/778,238

(22) PCT Filed: Mar. 6, 2014

(86) PCT No.: PCT/EP2014/000580
§ 371 (c)(1),
(2) Date: Sep. 18, 2015

(87) PCT Pub. No.: WO2014/146757
PCT Pub. Date: Sep. 25, 2014

(65) Prior Publication Data
US 2016/0280494 A1    Sep. 29, 2016

(30) Foreign Application Priority Data

Mar. 18, 2013 (EP) .................................... 13001359

(51) Int. Cl.
*B65H 29/58* (2006.01)
*B65H 29/60* (2006.01)
(Continued)

(52) U.S. Cl.
CPC .......... *B65H 29/12* (2013.01); *B65G 47/647* (2013.01); *B65H 29/585* (2013.01); *B65H 29/62* (2013.01);
(Continued)

(58) Field of Classification Search
CPC ......... B65H 29/58; B65H 29/60; B65H 29/62
(Continued)

(56) References Cited

U.S. PATENT DOCUMENTS 3,764,024 A * 10/1973 Mojden .............. B65G 21/2036
198/610
4,324,522 A *  4/1982 Buccicone ............. B65H 29/16
271/211

(Continued)

FOREIGN PATENT DOCUMENTS

DE    28 57 565 B1    9/1980
EP    0 884 262 A1    12/1998
(Continued)

OTHER PUBLICATIONS

International Search Report dated May 30, 2014 issued in corresponding International patent application No. PCT/EP2014/000580.
(Continued)

*Primary Examiner* — Gene Crawford
*Assistant Examiner* — Lester Rushin
(74) *Attorney, Agent, or Firm* — Ostrolenk Faber LLP

(57) ABSTRACT

A device for ejecting 1 a flat object 101 during the conveyance thereof along a conveying path 102 includes an inlet conveyor 10 and an outlet conveyor 20 which are successively arranged one after the other along the conveying path 102. At least the downstream part 11 of the inlet conveyor 10 is orientably mounted for pivoting between a conveying position and an ejecting position and at least the upstream part 21 of the outlet conveyor 20 is orientably mounted for pivoting between a conveying position and an ejecting position.

12 Claims, 4 Drawing Sheets

(51) Int. Cl.
*B65H 29/62* (2006.01)
*B65H 29/12* (2006.01)
*B65G 47/64* (2006.01)

(52) U.S. Cl.
CPC .... *B65G 2201/022* (2013.01); *B65H 2402/31* (2013.01); *B65H 2404/2532* (2013.01); *B65H 2404/2613* (2013.01); *B65H 2404/2691* (2013.01); *B65H 2701/1762* (2013.01)

(58) Field of Classification Search
USPC .............. 198/369.1, 369.2, 370.1, 371.2
See application file for complete search history.

(56) References Cited

U.S. PATENT DOCUMENTS

| | | | | |
|---|---|---|---|---|
| 5,472,185 A | * | 12/1995 | Kollann | B65H 29/58 198/367 |
| 5,944,165 A | * | 8/1999 | Mannlein | B65G 47/71 198/367 |
| 6,612,570 B1 | * | 9/2003 | Cox | B65H 29/60 271/279 |
| 7,490,712 B2 | * | 2/2009 | Hamers | B65G 47/642 198/369.7 |
| 8,752,691 B2 | * | 6/2014 | Cristoforetti | B65G 47/647 198/369.2 |

FOREIGN PATENT DOCUMENTS

| | | |
|---|---|---|
| EP | 2 316 766 A2 | 11/2012 |
| JP | A-49-31776 U | 3/1974 |
| JP | A-55-176230 U | 12/1980 |
| JP | 2006-096520 A | 4/2006 |
| JP | 2009-078462 A | 4/2009 |

OTHER PUBLICATIONS

Notification of Reason for Rejection dated Sep. 5, 2016 for Japanese Patent Application No. 2016-503564 with English translation.

* cited by examiner

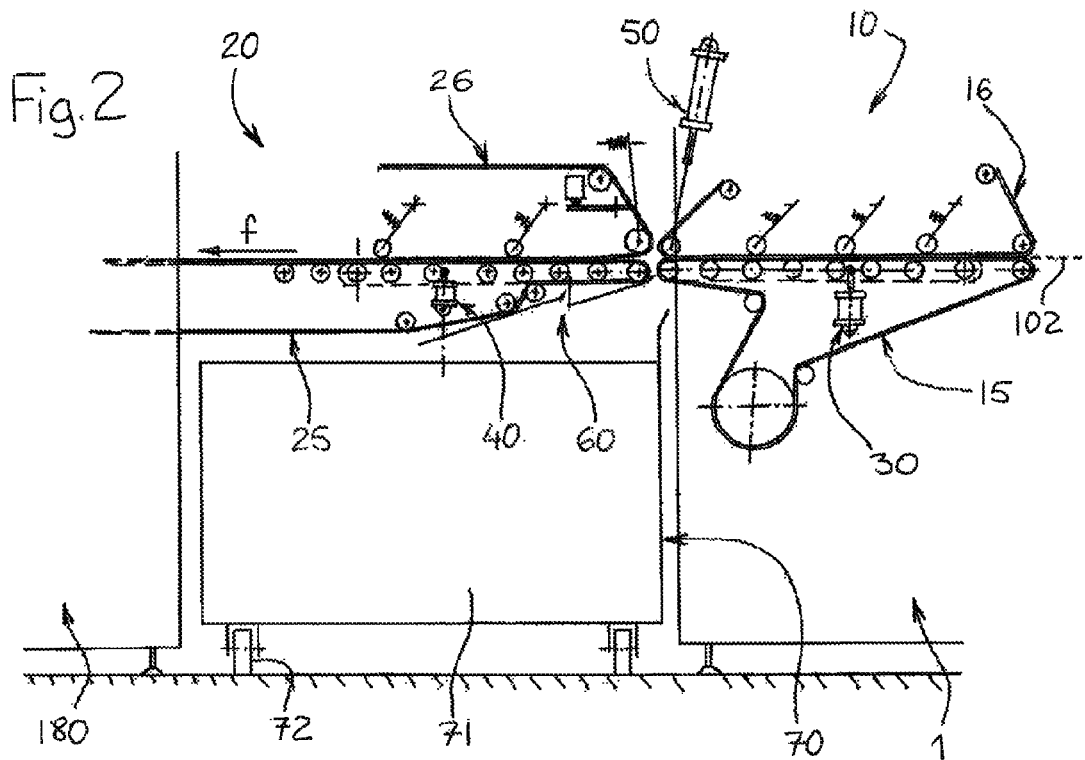
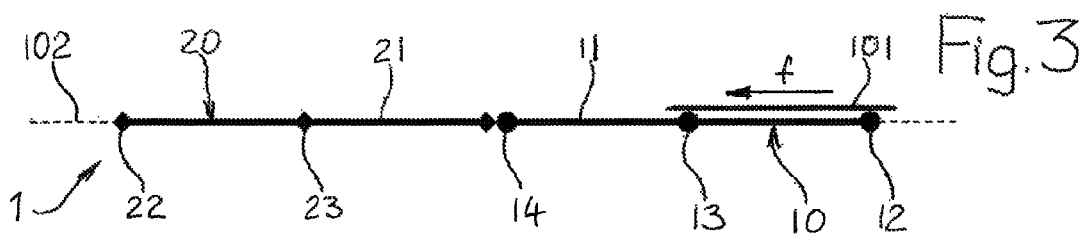
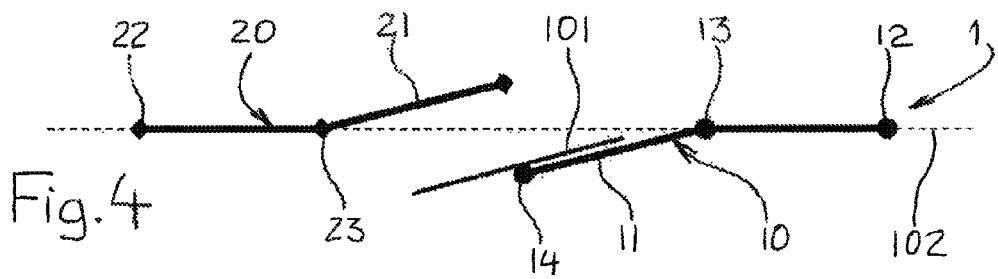

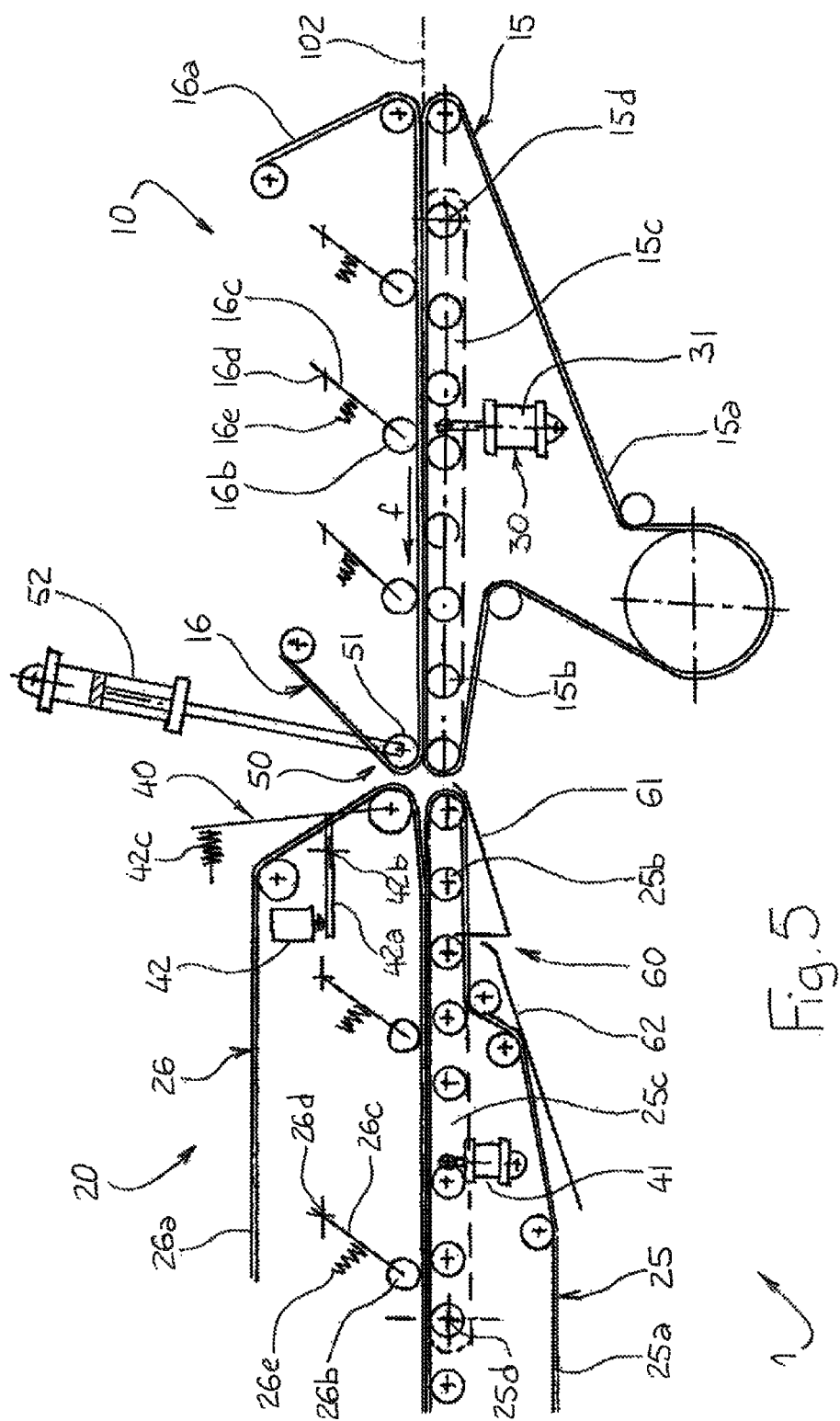

DEVICE FOR EJECTING A FLAT OBJECT DURING CONVEYING

CROSS-REFERENCE TO RELATED APPLICATIONS

The present application is a 35 U.S.C. §§ 371 national phase conversion of PCT/EP2014/000580, filed Mar. 6, 2014, which claims priority of European Patent Application No. 13001359.2, filed Mar. 18, 2013, the contents of which are incorporated by reference herein. The PCT International Application was published in the French language.

The present invention relates to a device permitting flat objects being conveyed along a path to be selectively ejected from the conveying path. The invention applies particularly advantageously, but not exclusively, to the field of manufacturing packaging boxes made of corrugated cardboard.

In the packaging industry, the manufacture of boxes is traditionally carried out on a production line, by folding and gluing blanks using a machine commonly called a folder-gluer. Such a processing machine generally comprises a succession of modules in which the many functional arrangements to implement the different basic operations necessary for the production of boxes are distributed. Each module has its own system for conveying the blanks. But, the assembly is arranged so that ultimately, the conveyance is carried out continuously over the entire length of the folder-gluer.

It is also known to monitor the quality of the blanks or the boxes inside a folder-gluer itself, to detect at the earliest possible moment of occurrence of potential faults, such as printing errors, folding errors or a lack of adhesive. A specific module is directly integrated in the folder-gluer which is capable of individually inspecting each blank or each box when the blank or box passes individually through the module. Such an inspection operation may take place at any location or moment of the process for manufacturing the boxes, such that the quality control module may theoretically be placed at any location of the folder-gluer.

In a folder-gluer, such a quality control system is generally combined with an ejection system placed further downstream. Said ejection system is designed to extract, from the continuous flow of boxes which passes through the folder-gluer, any item which has been previously identified as being faulty by the quality control system.

PRIOR ART

Amongst the devices for ejecting known from the prior art are those which discharge faulty boxes by diverting them from their normal conveying path by means of an orientable conveyor. Generally this is either a conveyor which is provided with a rigid structure which is integrally mounted so as to be mobile in displacement or a conveyor which is provided with a structure of variable geometry which is able to be deformed locally. This orientable conveyor is arranged along the conveying path of the boxes and is mounted so as to be orientable in the region of the downstream end thereof whilst the upstream end thereof remains permanently in the region of the conveying path; the displacement of the mobile path of the orientable conveyor now being similar to angular pivoting.

This type of device for ejecting, however, has the drawback of being particularly poorly suited to flat objects of large dimensions and/or large thicknesses and/or low flexibility, such as for example corrugated cardboard plates.

More specifically, during the ejection of a flat object, the mobile part of the orientable conveyor has to pivot by a significant angle in order to be able to be released completely from its immediate environment which is essentially composed of the conveyor directly adjacent downstream. As a result, once oriented in the ejecting position, the conveyor forms a considerable angle relative to the conveying path, having an angle which naturally has the tendency to mark any flat object which passes this particular location.

Moreover, as the pivoting of the mobile part of the orientable conveyor takes place over a large angular range, this also means that a relatively large period of time is required to pass from the conveying position to the ejecting position, and vice versa. More specifically, such a restriction will unfortunately have the result of reducing the operating capacity of the machine in which the device for ejecting is integrated.

SUMMARY OF THE INVENTION

The technical problem to be remedied by the subject of the present invention is to propose a device for ejecting a flat object during its conveyance along a conveying path, and is a device which enables problems of the prior art to be avoided by providing, in particular, particularly rapid implementation while guaranteeing the integrity of the flat objects.

The solution to this technical problem comprises the device for ejecting comprises an inlet conveyor and an outlet conveyor which are successively arranged one after the other along the conveying path. At least the downstream part of the inlet conveyor, called the orientable part, is movably mounted between a conveying position in which the inlet conveyor is capable of conveying the flat object along the conveying path, and an ejecting position in which the inlet conveyor is capable of conveying the flat object in a different direction from the conveying path. At least the upstream part of the outlet conveyor, called the orientable part, is movably mounted between a conveying position in which the outlet conveyor is capable of conveying the flat object along the conveying path, and an ejecting position in which the orientable part of the outlet conveyor extends in a direction which is different from the conveying path and in an area of space which, relative to the conveying path, opposes that occupied by the orientable part of the inlet conveyor when the inlet conveyor is also in the ejecting position.

The concept of a flat object applies to any flattened object of low thickness, irrespective of its shape, size or the material of which it is composed, such as an entire sheet, a pre-cut sheet, a set of templates or blanks attached at regular intervals to one another, an individual template or blank, a folding box, etc. Moreover, such a flat object may be produced of any material, in particular paper, compact cardboard, corrugated cardboard, plastics material, etc.

As a conveyor comprises at least one orientable part, this means that it is either a conveyor provided with a rigid structure capable of being displaced in its entirety, or a conveyor provided with a structure of variable geometry in order to be deformed locally, so that only one part of the conveyor may be displaced. Within this logic, each orientable conveyor may be of any known type. It is thus able to include one or more lower conveyors, by a combination of one or more upper conveyors with a system which is able to press the flat objects against the upper conveyors, by superposing one or more lower conveyors onto one or more upper conveyors, etc. In detail, each conveyor used may be of any type, such as a belt conveyor, a conveyor using rollers or a conveyor using guide rollers.

The principle of the invention consists in using two successive orientable conveyors having respective mobile ends which oppose one another. The inlet conveyor is designed to divert selectively the displacement of certain flat objects in order to carry out the actual ejection function, while the outlet conveyor plays a more passive role in this sense, where it merely facilitates the ejection. More specifically, the mobility of the orientable part of the outlet conveyor permits a space to be opened up in the region of the downstream end of the inlet conveyor. As a result, this permits the displacement range of the orientable part of the inlet conveyor to be reduced. Within this logic, it is essential that the displacements of the respective orientable parts take place in opposing areas relative to the conveying path.

The invention proves particularly well suited to flat objects of large dimensions and/or high thicknesses and/or low flexibility. More specifically, as the orientable part of the inlet conveyor is displaced over a small range, it proves to be particularly rapid to implement which avoids reducing the efficiency of the machine in which the device for ejecting is integrated. Moreover, the angle formed between the orientable part of the inlet conveyor and the conveying path is so slight that it never tends to mark the flat objects when they are diverted. Thus, the invention may be used both to carry out the ejection of waste items, i.e. to discharge faulty flat objects intended for disposal, and to take samples, i.e. to remove flat objects undamaged, in order potentially to be able to reuse them.

BRIEF DESCRIPTION OF THE DRAWINGS

The present invention further relates to the features which are disclosed from the following description and which have to be considered individually or according to any of the possible technical combinations thereof. This description, provided by way of non-limiting example, is designed to enable clearer understanding of the invention and how it may be implemented. The description is also provided with reference to the accompanying drawings, in which:

FIG. 2 shows in detail the integration of the device for ejecting inside the folder-gluer;

FIG. 3 is a schematic view of the device for ejecting in the conveying position;

FIG. 4 shows a schematic view of the device for ejecting in the ejecting position;

FIG. 5 shows the device for ejecting of FIG. 2 in the conveying position; and

DETAILED DESCRIPTION OF PREFERRED EMBODIMENTS

Figure 1:
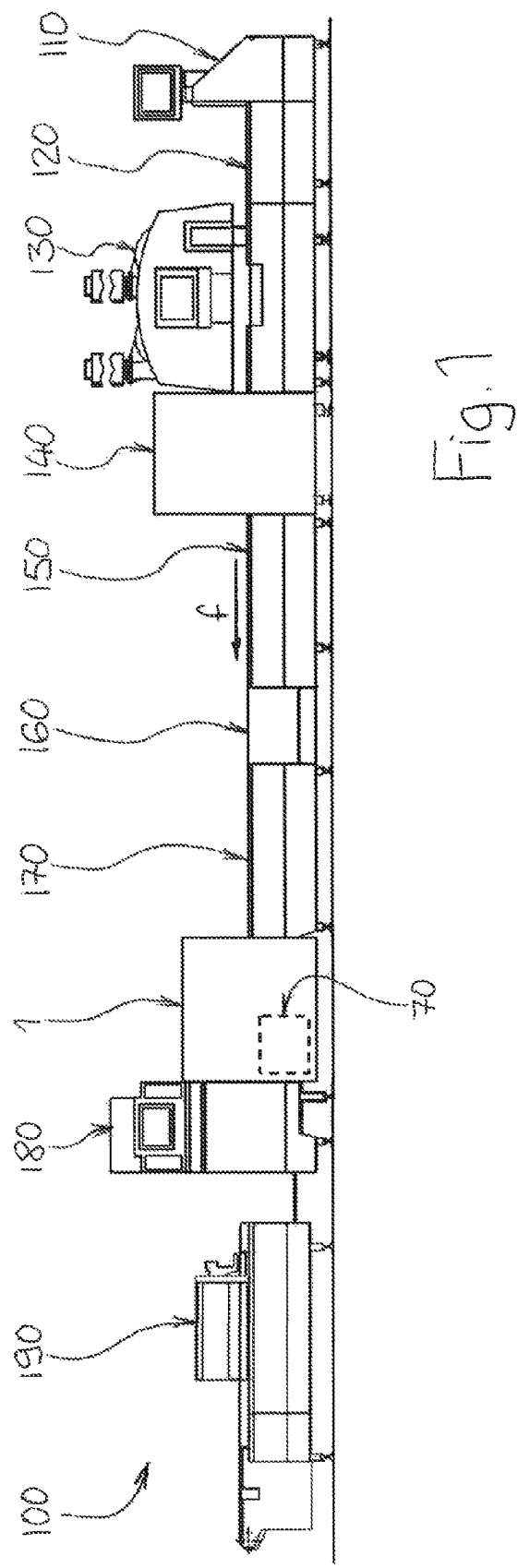
FIG. 1 illustrates a folder-gluer which is provided with a quality control system, a device for ejecting according to the invention being associated therewith.

FIG. 1 illustrates a folder-gluer 100 configured to fold and glue a succession of flat elements 101 which are in the form of blanks with a view to manufacturing folding boxes. Provided with a modular structure, this folder-gluer 100 is conventionally comprised of a feeder 110, an alignment module 120, a quality control module 130, a module for embossing braille characters 140, a pre-scoring module 150, a gluing module 160, a folding module 170, a transfer module 180 and a receiving module 190. As these different elements are sufficiently well known from the prior art they are not described in detail here, both structurally and functionally.

FIGS. 1 and 2 show that the folder-gluer 100 is further provided with a device for ejecting 1 which is placed directly between the folding module 170 and the transfer module 180. This device 1 is configured to eject selectively certain boxes 101 which are conveyed (arrow f) along the conveying path 102 which passes through the entire folder-gluer 100. In the present case, this refers to boxes 101 obtained from blanks which have been judged to be faulty by the quality control module 130 placed much further upstream in the folder-gluer 100.

Figure 6:
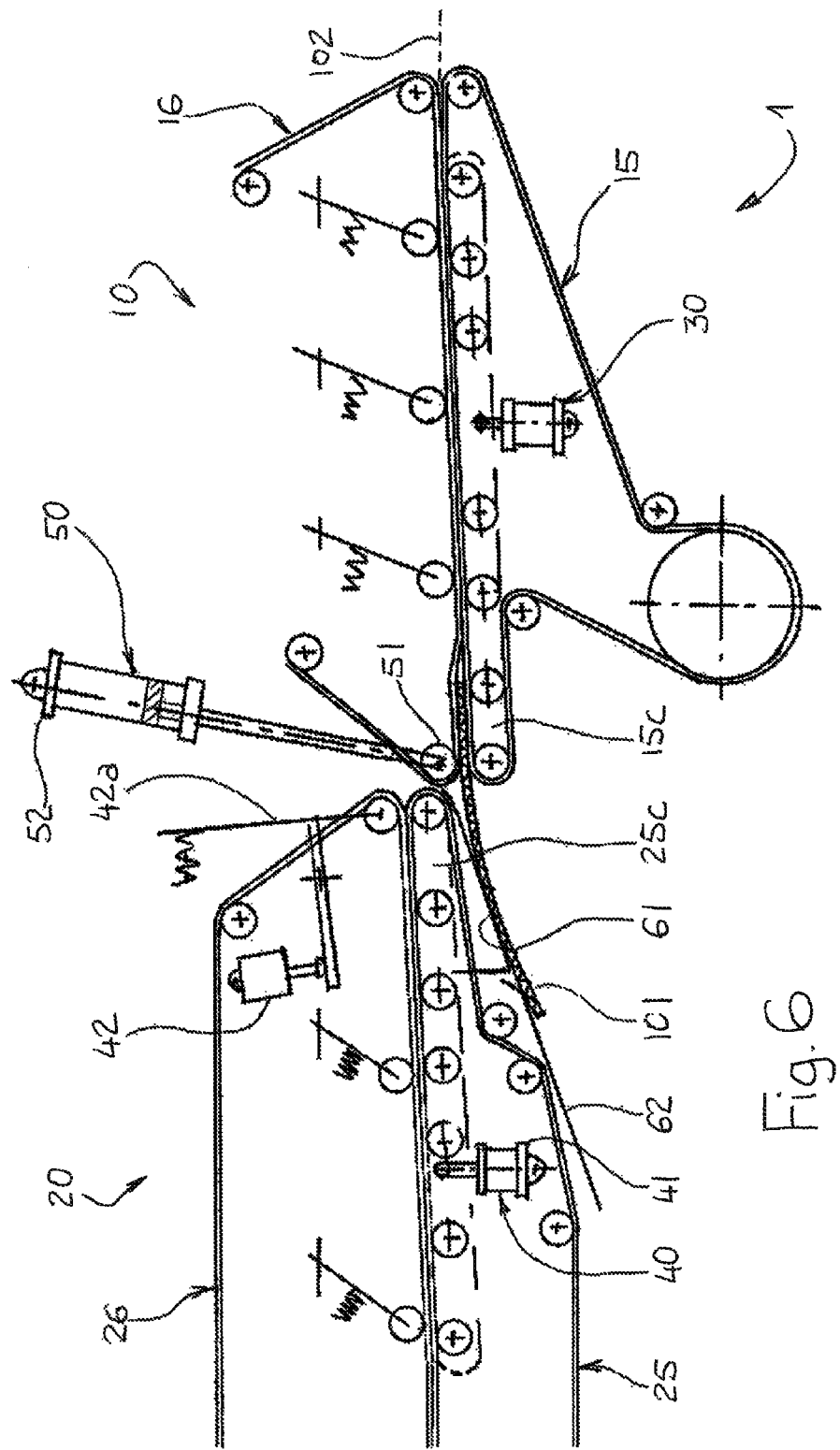
FIG. 6 shows the device for ejecting of FIG. 2 in the ejecting position.

The schematic views of FIGS. 3 and 4 facilitate the understanding of the primary features of the invention, given that the features in question are naturally repeated in their entirety in the embodiment of FIGS. 5 and 6.

According to the subject of the present invention, the device for ejecting 1 is comprised of two conveyors which are successively arranged one after the other along the conveying path 102, in this case an inlet conveyor 10 and an outlet conveyor 20. The downstream part of the inlet conveyor 10, called the orientable part 11, is movably mounted in displacement. This mobility is implemented between a conveying position in which the inlet conveyor 10 is able to convey any box 101 along the conveying path 102 (FIG. 3) and an ejecting position in which the inlet conveyor 10 is able to convey any box 101 in a direction which is different from the conveying path 102 (FIG. 4). The upstream part of the outlet conveyor 20, called the orientable part 21, is also movably mounted in displacement between a conveying position and an ejecting position. However, the assembly is in this case arranged such that, in the conveying position, the outlet conveyor 20 is able to convey any box 101 along the conveying path 102 (FIG. 3) and, in the ejecting position, the orientable part 21 of the outlet conveyor 20 extends both in a direction which is different from the conveying path 102 and into an area of space which, relative to the conveying path 102, opposes that occupied by the orientable part 11 of the inlet conveyor 10 when the inlet conveyor is also in the ejecting position (FIG. 4).

According to a particular feature of the invention, the upstream end 12 of the inlet conveyor 10 is permanently positioned in the region of the conveying path 102, whether the orientable part 11 is in the conveying position (FIG. 3), in the ejecting position (FIG. 4) or being displaced. This feature makes it possible to eject a given box, while undertaking conveying of the following box(es) in the region of the inlet conveyor 10.

In a substantially similar manner, the downstream end 22 of the outlet conveyor 20 is permanently positioned in the region of the conveying path 102 and the orientable part 21 is in the conveying position (FIG. 3), in the ejecting position (FIG. 4) or being displaced. Such an arrangement also permits a given box to be ejected, while discharging the preceding box(es), the conveying thereof already having been undertaken by the outlet conveyor 20.

According to a further particular feature of the invention, clearly visible in FIG. 4, in the ejecting position the orientable part 11 of the inlet conveyor 10 and the orientable part 21 of the outlet conveyor 20 extend in directions which are each oblique relative to the conveying path (102), the respective inclines thereof being substantially identical. This feature makes it possible to distribute equally between the two conveyors 10, 20, the relative mobility in separation which is required for the corresponding orientable parts 11, 21 so that the ejection is carried out correctly. The importance of this configuration is to make the respective displacements of the orientable parts 11, 21 uniform, in order simply to be able to achieve similar displacement times. The final objective is to facilitate the operating kinematics of the device for ejecting 1 as a whole.

In a particularly advantageous manner, as the conveying path 102 extends substantially horizontally, the displacement of the orientable part 11 of the inlet conveyor 10 is carried out downwardly, while the displacement of the orientable part 21 of the outlet conveyor 20 is carried out upwardly. Such an arrangement permits the boxes 101 to be discharged downwardly and thus permits gravity to be used to cause their displacement beyond the inlet conveyor 10. It is thus possible to dispense with an additional conveyor which represents an advantage in terms of space required, cost and reliability for the entire device for ejecting 1.

According to an embodiment of the invention which is currently preferred, the orientable part 11 of the inlet conveyor 10 is pivotably movably mounted relative to a transverse axis which is located in the region of the conveying path 102 and which is positioned at the upstream end 13 of the orientable part 11. For its part, the orientable part 21 of the outlet conveyor 20 is pivotably movably mounted relative to a transverse axis which is located in the region of the conveying path 102 and which is positioned at the downstream end 23 of the orientable part 21. The assembly is naturally arranged so that between the conveying position and the ejecting position, the orientable part 11 of the inlet conveyor 10 and the orientable part 21 of the outlet conveyor 20 pivot in opposite directions. The corresponding pivot axes here are perfectly parallel.

In FIGS. 5 and 6, in this particular embodiment solely selected by way of example, each conveyor 10 and 20 comprises superposition of two belt conveyors, including a lower conveyor 15 and 25 and an upper conveyor 16 and 26. Each of these belt conveyors 15, 16, 25 and 26 is conventionally composed of an endless belt 15a, 16a, 25a and 26a which is capable of being driven so as to travel relative to a plurality of guide rollers 15b, 16b, 25b and 26b used for diverting and/or support.

The orientable part 11 of the inlet conveyor 10 relates both to the downstream part of the lower conveyor 15 and the downstream part of the upper conveyor 16. The guide rollers 15b which support the conveyor belt 15a in the region of the downstream part of the lower conveyor 15 are fixed to a support 15c which is pivotably mounted relative to a transverse axis 15d. The guide rollers 16b which hold the conveyor belt 16a in the region of the downstream part of the upper conveyor 16 are in turn mounted so as to be individually mobile in displacement in order to be able to follow optimally the pivoting of the downstream part of the lower conveyor 15. In practice, each guide roller 16b is fixed at the end of a connecting rod 16c which is pivotably mounted relative to a transverse axis 16d and which is coupled to a compression spring 16e designed to cause the pivoting thereof, such that the guide roller 16b presses permanently the conveyor belt 16a against the lower conveyor 15.

Similarly, the orientable part 21 of the outlet conveyor 20 relates both to the upstream part of the lower conveyor 25 and the upstream part of the upper conveyor 26. The guide rollers 25b which support the conveyor belt 25a in the region of the upstream part of the lower conveyor 25 are fixed to a support 25c which is pivotably mounted relative to a transverse axis 25d. The guide rollers 26b which hold the conveyor belt 26a in the region of the upstream part of the upper conveyor 26 are in turn individually mounted so as to be mobile in displacement in order to be able to accompany optimally the pivoting of the upstream part of the lower conveyor 25. In detail, each guide roller 26b is fixed to the end of a connecting rod 26c which is pivotably mounted relative to a transverse axis 26d and which is coupled to a compression spring 26e designed to cause the pivoting thereof, such that the guide roller 26b presses permanently the conveyor belt 26a against the lower conveyor 25.

According to a further particular feature of the invention, the device for ejecting 1 is provided with first actuating means 30 which are capable of causing the displacement of the orientable part 11 of the inlet conveyor 10 between the conveying position and the ejecting position.

In this embodiment, the first actuating means 30 consist of an actuator 31 which operates substantially vertically to tilt the pivoting support 15c, the guide rollers 15b which support the conveyor belt 15a in the region of the downstream part of the lower conveyor 15 being mounted thereon.

Similarly, the device for ejecting 1 is provided with second actuating means 40 which are capable of causing the displacement of the orientable part 21 of the outlet conveyor 20 between the conveying position and the ejecting position.

In this embodiment, the second actuating means 40 firstly comprise a first actuator 41 which operates substantially vertically to tilt the pivoting support 25c, the guide rollers 25b which support the conveyor belt 25a in the region of the upstream part of the lower conveyor 25 being mounted thereon. However, the second actuating means 40 also comprise a second actuator 42 which in turn operates vertically to tilt a support 42a which is pivotably mounted relative to a transverse axis 42b and which supports at its end the guide roller 26b forming the upstream end of the upper conveyor 26. A compression spring 42c is also provided to facilitate the return of the pivoting support 42a into its initial position which corresponds to the conveying position.

In a particularly advantageous manner, the device for ejecting 1 also comprises expulsion means 50 which are designed to expel each box 101 at the downstream end 14 of the inlet conveyor 10 when the orientable part 11 is in the ejecting position.

In this embodiment, the expulsion means 50 comprise an ejection guide roller 51 which is placed at the downstream end of the upper conveyor 16 of the inlet conveyor 10 and which is movably mounted in displacement so as to be capable of pressing the conveyor belt 16a against its equivalent of the lower conveyor 15. To achieve this, the ejection guide roller 51 is mounted at the end of an actuator 52 which is capable of displacing said guide roller substantially vertically as a function of the position of the downstream part of the lower conveyor 15.

According to a further advantageous feature, the device for ejecting 1 also comprises guide means 60 which are capable of guiding the displacement of each box 101 at the outlet of the inlet conveyor 10 when the orientable part 11 is in the ejecting position.

In this embodiment, the guide means 60 comprise a static deflector 61 which is stationary, in addition to a mobile deflector 62 which is fixed to the orientable part 21 of the outlet conveyor 20. The assembly is also arranged such that when the outlet conveyor 20 is in the ejecting position, the mobile deflector 62 extends in a substantially coplanar manner relative to the static deflector 61 (FIG. 6).

According to a further particular feature of the invention visible in FIGS. 1 and 2, the device for ejecting 1 is also provided with collection means 70 which are capable of receiving each box 101 which is discharged at the outlet of the inlet conveyor 10. It is understood here that these collection means 70 may be of any known type, such as a mobile carriage which is removably mounted, a discharge belt or a collection hopper, for example.

In this embodiment, the collection means 70 consist of a mobile carriage 71 which is located below the downstream end 14 of the inlet conveyor 10 and which is mounted so as to be able to be removed outside of the device for ejecting 1 by means of a series of casters 72.

Naturally, the invention also relates to any module of a folding and gluing machine 100 which comprises at least one device for ejecting 1 as disclosed above. Within this reasoning, it is important to mention here that a device for ejecting according to the invention may be integrated in any manner in a specific module, i.e. specifically dedicated to the ejection, in a module already having a principal functionality, or simultaneously in two directly adjacent modules.

However, more generally still, the invention also relates to any folding and gluing machine 100 provided with at least one device for ejecting 1 as described above.

The invention claimed is:

1. A device for ejecting a flat object during conveyance of the object along a conveying path, the device comprises:
    an inlet conveyor followed by an outlet conveyor along the conveying path extending substantially horizontally;
    the inlet conveyor has an upstream part with an upstream end that is permanently positioned in the region of the conveying path and an orientable downstream part, and at least the downstream part of the inlet conveyor is movably orientably mounted between a conveying position at which the inlet conveyor is configured to convey the flat object along the conveying path, and an ejecting position in which the orientable downstream part of the inlet conveyor is configured to convey the flat object in a direction different from a direction of the conveying path; and
    the outlet conveyor having an orientable upstream part and a downstream part with a downstream end which is permanently positioned in a region of the conveying path; at least the upstream part of the outlet conveyor is movably orientably mounted between a conveying position, in which the outlet conveyor is configured to convey the flat object along the conveying path, and the ejecting position in which the orientable upstream part of the outlet conveyor extends in a direction which is different from the conveying path and extends in an area of space which, relative to the conveying path, opposes the area of space occupied by the orientable part of the inlet conveyor when the inlet conveyor is also in the ejecting position,
    wherein each of the inlet conveyor and the outlet conveyor comprises two superposed conveyors, including a lower conveyor and an upper conveyor,
    wherein the orientable downstream part of the inlet conveyor comprises both the downstream part of the corresponding lower conveyor and the downstream part of the corresponding upper conveyor, and
    wherein the orientable upstream part of the outlet conveyor comprises both the upstream part of the corresponding lower conveyor and the upstream part of the corresponding upper conveyor.

2. The device as claimed in claim 1, wherein when the orientable part of the inlet conveyor and the orientable part of the outlet conveyor are both in their ejecting positions, both orientable parts extend in respective directions which are oblique relative to the conveying path, wherein respective oblique inclines of both orientable parts are substantially identical.

3. The device as claimed in claim 1, wherein the conveying path extends substantially horizontally, the displacement of the orientable part of the inlet conveyor is downwardly, while the displacement of the orientable part of the outlet conveyor is upwardly with respect to the conveying path.

4. The device as claimed in claim 1, wherein the orientable part of the inlet conveyor is pivotably movably mounted relative to a first transverse axis which is located in the region of the conveying path and which is positioned at the upstream end of the orientable part of the inlet conveyor, and the orientable part of the outlet conveyor is pivotably movably mounted relative to a second transverse axis which is located in the region of the conveying path and which is positioned at the downstream end of the orientable part of the outlet conveyor.

5. The device as claimed in claim 1, further comprising:
    first actuating means configured for causing displacement of the orientable part of the inlet conveyor between the conveying position and the ejecting position.

6. The device as claimed in claim 5, further comprising:
    second actuating means configured for causing displacement of the orientable part of the outlet conveyor between the conveying position and the ejecting position.

7. The device as claimed in claim 1, further comprising expulsion means located and configured for expelling each flat object at a downstream end of the inlet conveyor when the orientable part of the inlet conveyor is in the ejecting position.

8. The device as claimed in claim 5, further comprising guide means configured for guiding displacement of each flat object at the downstream end of the inlet conveyor when the orientable part of the inlet conveyor is in the ejecting position.

9. The device as claimed in claim 8, further comprising the guide means comprises a stationary deflector, a mobile deflector which is fixed to the orientable part of the outlet conveyor, such that when the outlet conveyor is in the ejecting position, the mobile deflector extends in a substantially coplanar manner relative to the static deflector.

10. The device as claimed in claim 1, further comprising collection means configured for receiving each flat object which is discharged at the downstream end of the inlet conveyor.

11. A folding and gluing machine module comprising at least one device for ejecting as claimed in claim 1.

12. A folding and gluing machine, comprising at least one device for ejecting as claimed in claim 1.

* * * * *